(12) United States Patent
Evraets et al.

(10) Patent No.: US 11,191,389 B2
(45) Date of Patent: Dec. 7, 2021

(54) OIL-FILTRATION SYSTEM WITH ELECTRONIC SAFETY LOCKING SYSTEM

(71) Applicant: Oberlin Filter Company, Pewaukee, WI (US)

(72) Inventors: Eric J. Evraets, Mukwonago, WI (US); James Steffl, Watertown, WI (US)

(73) Assignee: Oberlin Filter Co., Pewaukee, WI (US)

( * ) Notice: Subject to any disclaimer, the term of this patent is extended or adjusted under 35 U.S.C. 154(b) by 179 days.

(21) Appl. No.: 16/710,036

(22) Filed: Dec. 11, 2019

(65) Prior Publication Data

US 2021/0177208 A1 Jun. 17, 2021

(51) Int. Cl.
*A47J 37/12* (2006.01)

(52) U.S. Cl.
CPC ....... *A47J 37/1223* (2013.01); *A47J 37/1266* (2013.01)

(58) Field of Classification Search
CPC . A47J 37/1223; A47J 37/1266; B01D 33/808; B01D 35/147; B01D 2201/54
See application file for complete search history.

(56) References Cited

U.S. PATENT DOCUMENTS

2009/0039004 A1* 2/2009 Andersen ............ A47J 37/1266
210/167.28

* cited by examiner

*Primary Examiner* — Patrick Orme
(74) *Attorney, Agent, or Firm* — Jansson Munger McKinley & Kirby Ltd.

(57) ABSTRACT

The present invention is a cooking-oil filtration system for automated cooking apparatus which has a solids-removing filter for cleaning cooking oil from the food-fryer and returning oil to the cooking apparatus. The system comprises a solids-removing filter enclosure which includes a plurality of doors having electronically controlled locks with lock-state feedback, a controller including memory and software for controlling the system and a user interface, a number of electrically-controlled pumps, valves, actuators and sensors, the user interface comprising screens with icons representing system set-up, status, and actions. The screens include a main screen, an operator controls screen with controls including door-lock controls displaying door-lock status and controls to lock and unlock the doors, such unlocking permitted only when at least one pump is off and the filter-chamber pressure is below a predetermined pressure, one or more status screens displaying filter operation status, and one or more setup screens.

7 Claims, 10 Drawing Sheets

OIL-FILTRATION SYSTEM WITH ELECTRONIC SAFETY LOCKING SYSTEM

FIELD OF THE INVENTION

The invention relates generally to oil-filtration systems and methods for utilizing high pressures for removing solids from high-temperature cooking oil in industrial cooking operations and, more particularly, to providing safe operation of oil-filtration systems in automated, continuous industrial cooking operations.

BACKGROUND OF THE INVENTION

During industrial cooking operations, solids accumulate in the cooking oil used in such processes. In high-quality cooking operations, oil-filtration systems are employed as part of the equipment in order to remove solids from the cooking oil and thus prolong the life of the oil.

A variety of filtration systems are used in the food industry. One exemplary filtration system of the sort to which the present invention applies uses automatically replaced filter media and pump pressure to force solids-containing oil from the cooking apparatus through the filter media. Then, intermittently, i.e., after accumulation on the filter media of a filter cake of solids, the system applies air pressure in a "drying" step to remove as much oil as reasonably possible from the filter cake on the filter media (in order to reduce loss of oil), after which a new portion of filter media is moved into position and the "dried" cake of filtered-out solids from the cooking oil is discarded.

For reasons of safety, cooking-oil filtration systems for automated food-fryers and other such cooking apparatus which have solids-removing filters for cleaning cooking oil from the cooking apparatus and returning oil to the cooking apparatus are situated within enclosures which permit ingress and egress of filter materials and substances removed by the filtering process. In addition, adjustments to the systems and other maintenance tasks require that access to the inside of the enclosure is often necessary. Under normal operating conditions, fluid pressures within various components of the cooking-oil filtration system are of necessity at levels unsafe for human exposure if fluid is released. In addition, mechanical movement within certain components of the systems also poses a safety hazard to personnel exposed to these components under such conditions. Experience has shown that personnel operating cooking-oil filtration systems for automated cooking apparatus often access the systems inside an enclosure during operation of the system and expose themselves to dangerous levels of risk of injury. Thus there is a need for systems which prevent access under such unsafe conditions, and the purpose of the present invention is to provide a system which prevents exposure of operating and maintenance personnel to such risks.

SUMMARY OF THE INVENTION

The present invention is a cooking-oil filtration system for automated cooking apparatus which has a solids-removing filter for cleaning cooking oil from the food-fryer and returning oil to the cooking apparatus. The system comprises: (1) a solids-removing filter enclosure which includes a plurality of doors having electronically controlled locks with lock-state feedback; (2) a programmable controller including memory and software for controlling the filtration system and a graphical user interface; (3) a filter pump and a clean pump, each electrically-controlled; (4) a filter chamber and an electrically-controlled filter-chamber actuator; (5) a filter-chamber position sensor; (6) an electrically-controlled media discharge reroller; (7) a filter-chamber pressure sensor; and (8) at least one display presenting the graphical user interface comprising a plurality of screens with icons for interaction by a user, each of the icons representing system set-up, status, and actions. The screens include: (a) a main screen with an array of high-level system controls; (b) an operator controls screen displaying an array of icons representing a plurality of filter-operating controls including door-lock controls displaying door-lock status and controls to lock and unlock the doors, such unlocking permitted only when at least one pump is off and the filter-chamber pressure is below a predetermined pressure; (c) one or more status screens displaying status of filter operation; and (d) one or more setup screens for setting filter operating parameters.

In preferred embodiments of the inventive cooking-oil filtration system, unlocking the doors further requires that both the filter and clean pumps are off. In some of these embodiments, unlocking the doors further requires that the filter chamber is open.

In some highly-preferred embodiments, unlocking the doors further requires that the discharge reroller is stopped.

In some highly-preferred embodiments of the inventive cooking-oil filtration system, the predetermined pressure is 2 psi above atmospheric pressure.

In some embodiments, the cooking-oil filtration system further includes an external bypass valve configured to (a) return cooking oil to the cooking apparatus without passing through the filter chamber and (b) provide an external-bypass-valve status signal to the controller. In some of these embodiments, the at least one pump is the clean pump and unlocking the doors further requires that the external bypass valve be in a bypass mode.

DETAILED DESCRIPTIONS OF PREFERRED EMBODIMENTS

The present invention is an improvement of a cooking-oil filtration system for automated cooking apparatus which have a solids-removing filter system for cleaning cooking oil from the food-fryer. In the following description, the exemplary cooking apparatus described is a food-fryer. Note that such exemplary apparatus is not intended to be limiting; all cooking apparatus which use a substantial quantity of cooking oil are within the scope of the present invention.

Figure 1:
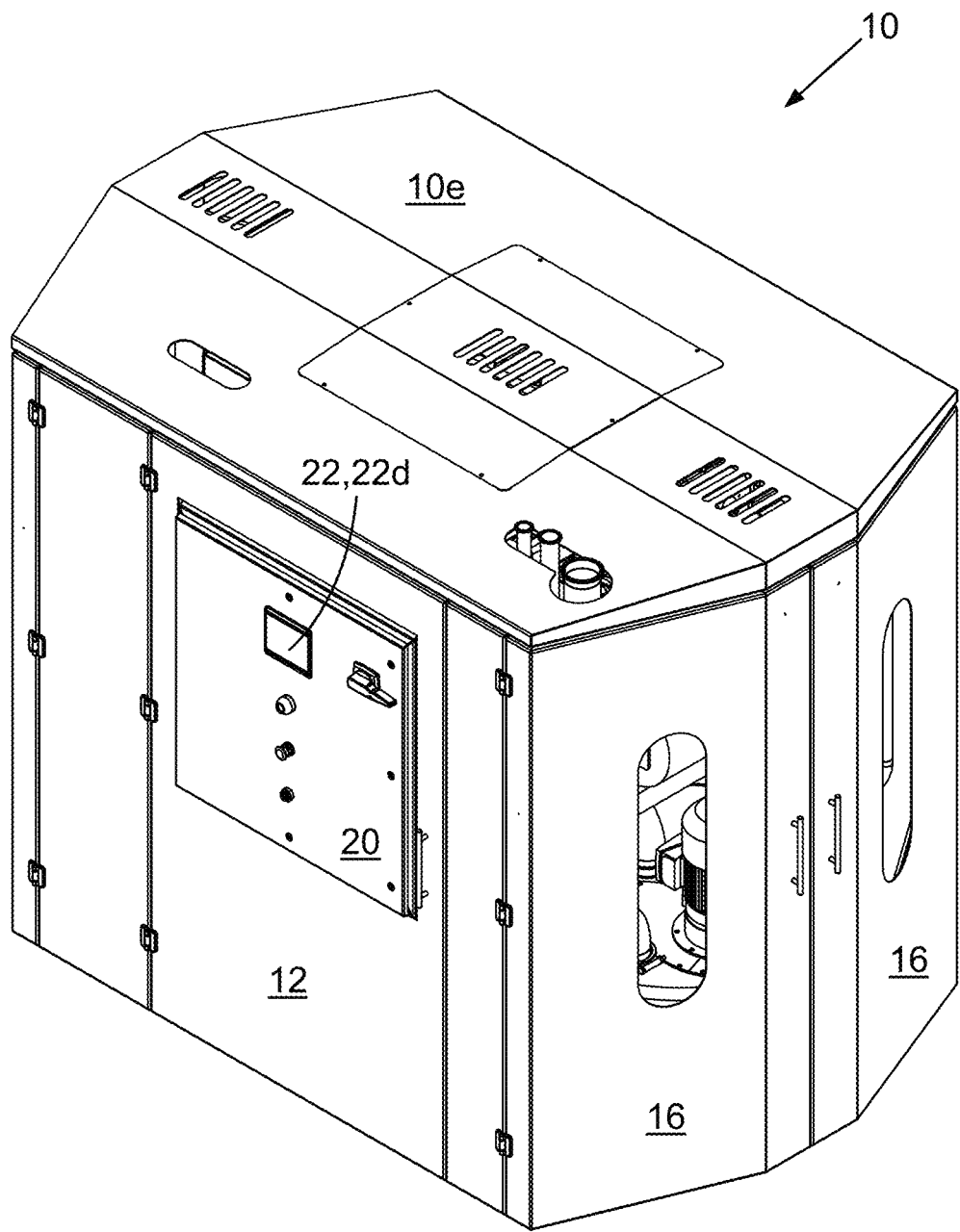
FIG. 1 is a perspective view of an embodiment of the cooking-oil filtration system of this invention with all doors closed.
Figure 2:
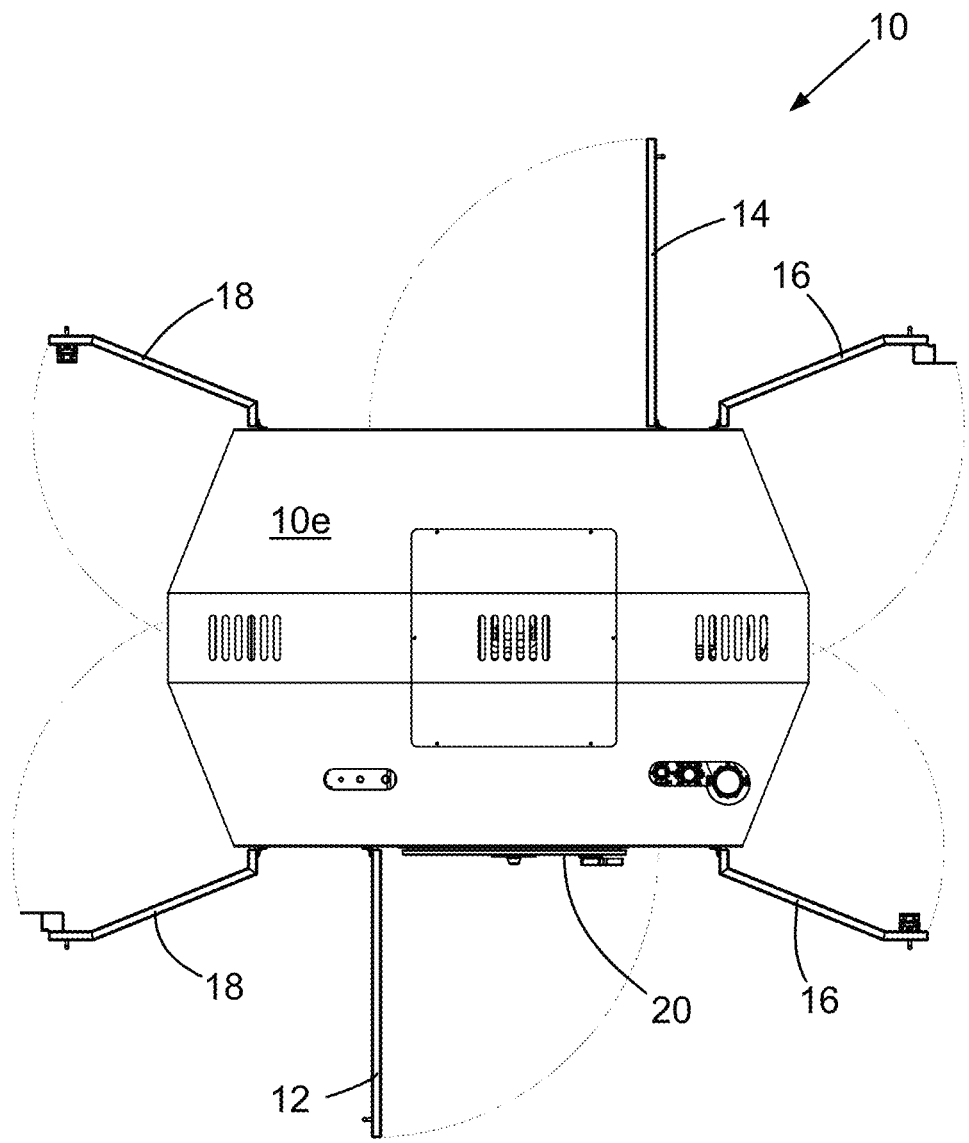
FIG. 2 is a top-view elevation drawing of the embodiment of the cooking-oil filtration system of FIG. 1 showing all doors open.
Figure 3:
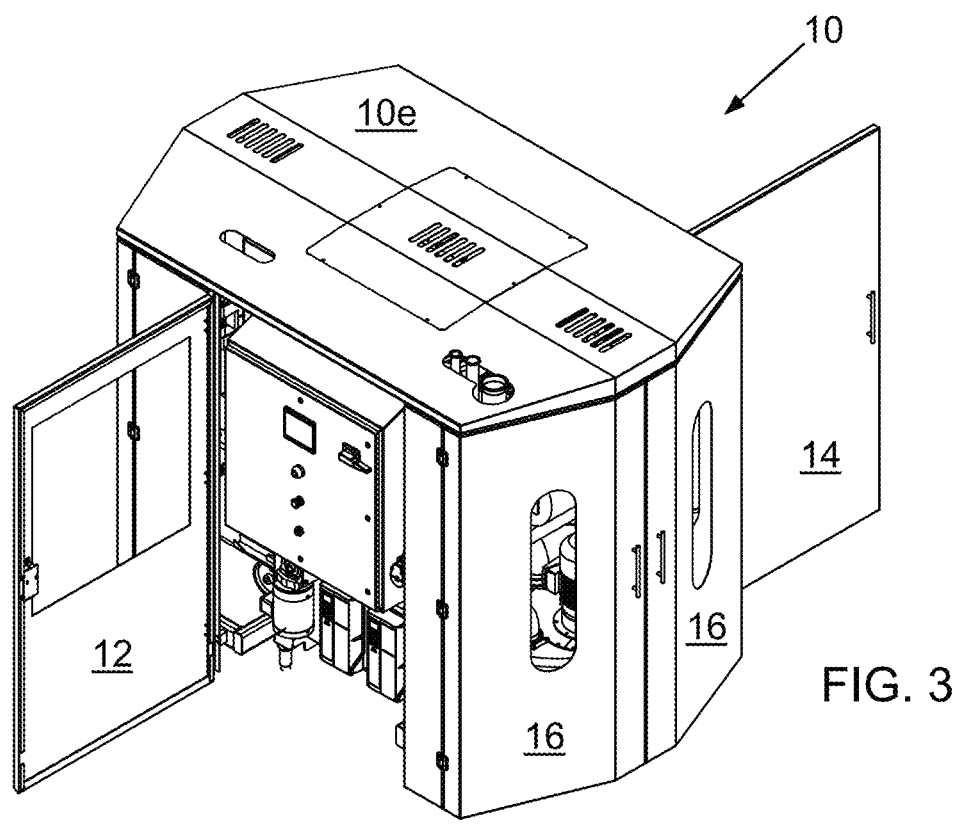
FIG. 3 is a perspective view of the embodiment of the cooking-oil filtration system of FIG. 1 with the left and right doors open and viewed from the left and the feed end.
Figure 4:
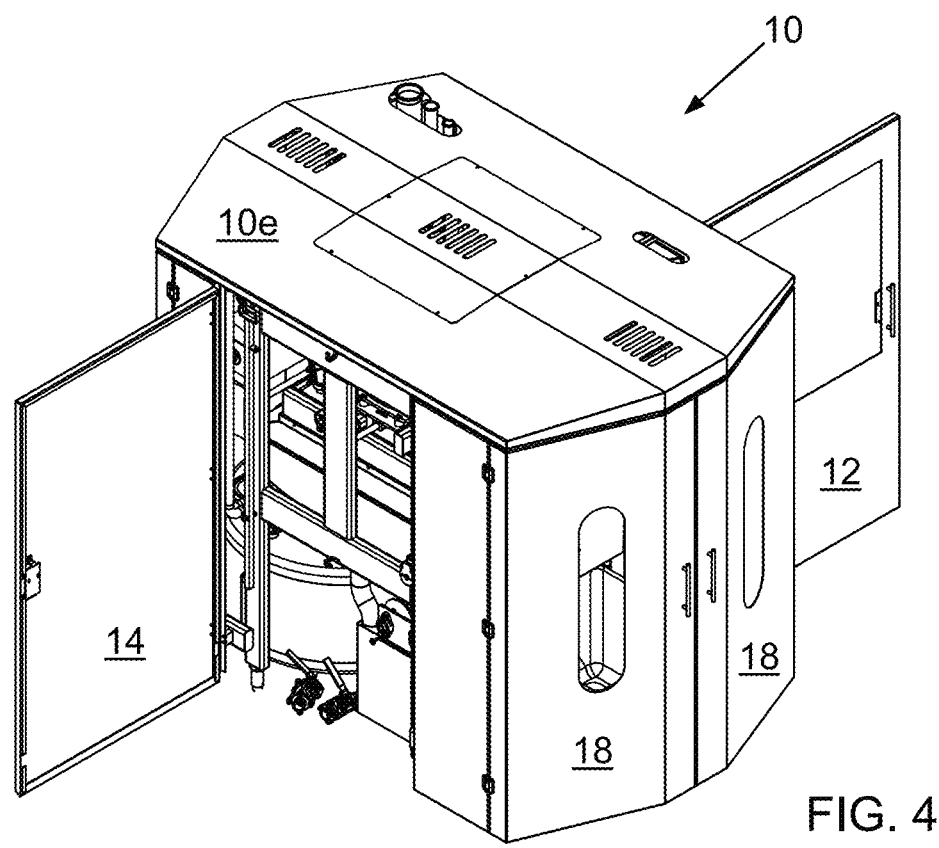
FIG. 4 is a perspective view of the embodiment of the cooking-oil filtration system of FIG. 1 with the left and right doors open and viewed from the right and discharge end.
Figure 5:
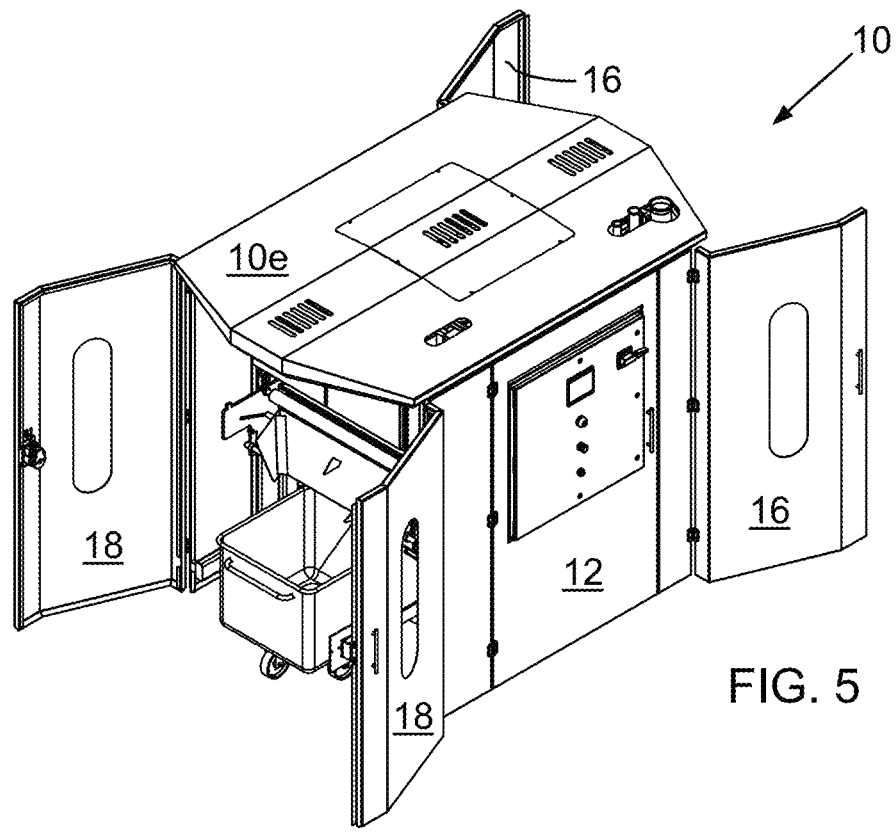
FIG. 5 is a perspective view of the embodiment of the cooking-oil filtration system of FIG. 1 with the feed-end and discharge-end doors open and viewed from the left and discharge end.
Figure 6:
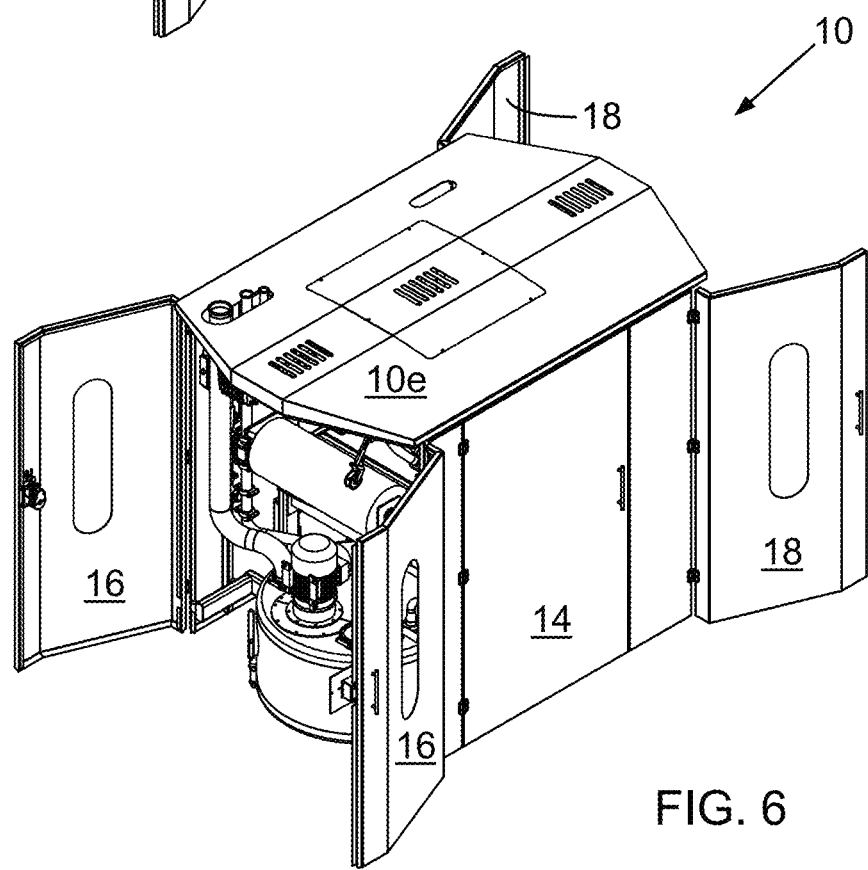
FIG. 6 is a perspective view of the embodiment of the cooking-oil filtration system of FIG. 1 with the feed-end and discharge-end doors open and viewed from the right and feed end.
Figure 7:
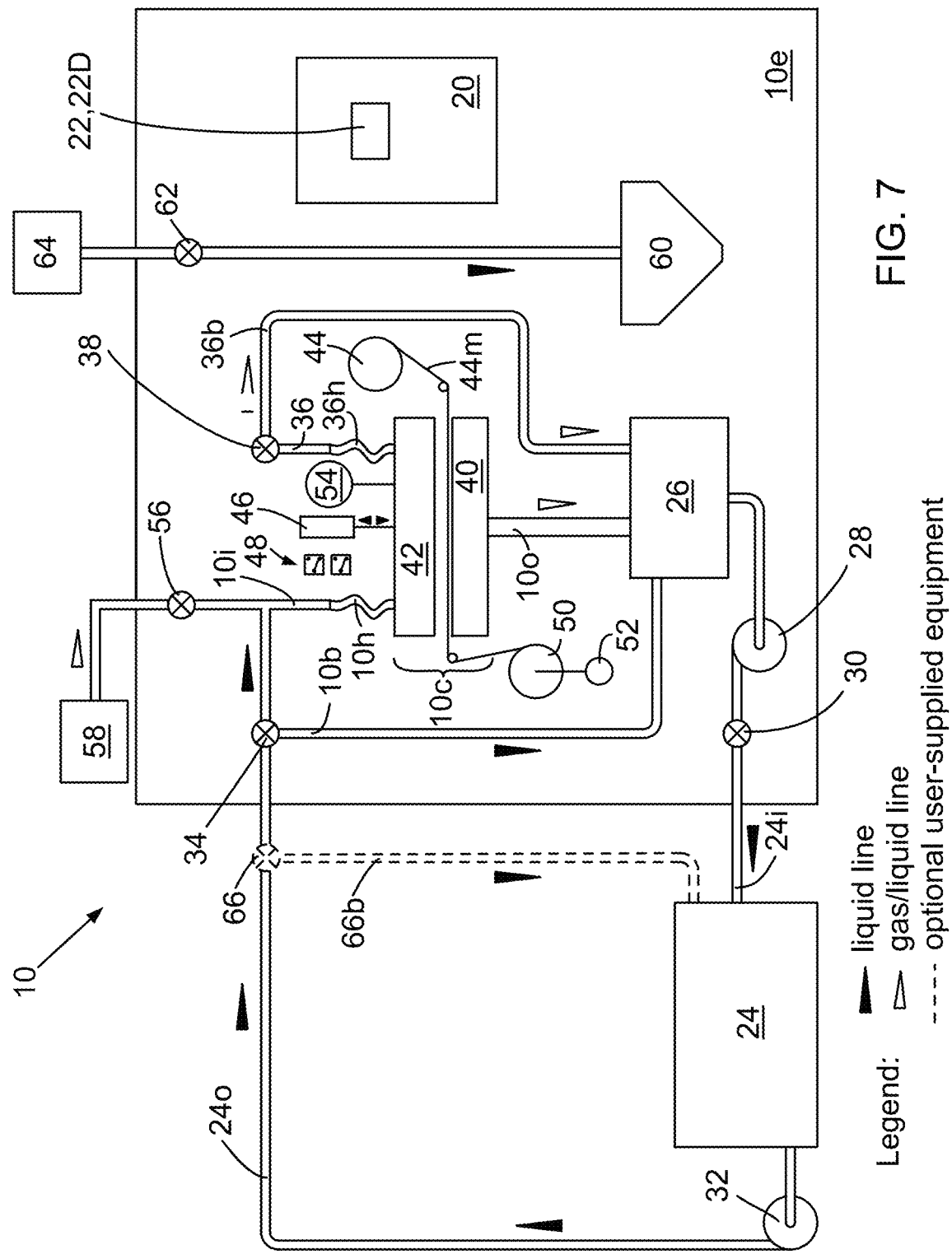
FIG. 7 is a schematic diagram of the embodiment of the cooking-oil filtration system of FIG. 1 showing the connectivity of the system components.

FIGS. 1 through 6 show six different views of an embodiment 10 of an exemplary cooking-oil filter system (also referred to by reference number 10) for cleaning cooking oil from a food-fryer 24 (see FIG. 7). FIG. 1 is a perspective view of embodiment 10. Embodiment 10 includes an enclosure 10e which has a plurality of access doors as illustrated in FIGS. 1-6, and a programmable controller 20 which includes memory (not explicitly shown), a graphical user interface 22 with a display 22d, and software programmed for controlling filter system 10. (In embodiment 10, display 22d is a touch screen. Graphical user interface 22 is also often known as human-machine interface or HMI.) FIG. 2 is a top-view elevation drawing of embodiment 10, and FIGS. 3 through 6 show embodiment 10 in perspective as viewed from four different directions to illustrate the plurality of doors included in enclosure 10e.

Referring to FIGS. 1-6, cooking-oil filter system 10 includes a left door 12, a right door 14, a pair of feed-end doors 16, and a pair of discharge-end doors 18. (Left and right are defined by viewing system 10 facing feed-end doors 16.) Each of the doors or pair of doors includes an electromagnetic door lock 12L, 14L, 16L, and 18L, respectively, which are controlled by controller 20 such that when a lock is in a locked state, the corresponding door or pair of doors is not able to be opened.

FIG. 7 is a fluid and mechanical schematic diagram of cooking-oil filtration system 10 showing the connectivity of the various system components. As illustrated in FIG. 7, cooking-oil filtration system 10 includes a filter chamber 10c which includes a lower platen 40 and an upper platen 42. A filter-chamber actuator 46 moves upper platen 42 between open and closed positions, and a pair of platen position switches 48 indicate the open/closed state of upper platen 42. A filter-chamber pressure sensor 54 senses the pressure in filter chamber 10c and provides an additional indication of the operational state of filter chamber 10c. Filter chamber 10c may include an airbag (not shown) to work in conjunction with actuator 46 to assist in the sealing of filter chamber 10c while chamber 10c is under operating pressures.

Cooking-oil filtration system 10 also includes a filter inlet line 10i, a filter outlet line 10o, a bleedoff line 36, a clean tank 26, a clean pump 28, and a filter pump 32. Filter inlet line 10i and bleedoff line 36 each include a flexible hose, 10h and 36h, respectively, to allow upper platen 42 to move between open and closed positions when moved by actuator 46. Actuator 46 may be a linear or rotary pneumatic, hydraulic or electrical actuator as desired; actuator 46 in embodiment 10 is an air cylinder.

Cooking-oil filtration system 10 further includes a clean-media roller 44 holding clean media 44m, a spent-media roller 50, and a reroller 52 for removing spent media and installing clean media 44m in filter chamber 10c.

Filter pump 32 pumps cooking oil from a fryer 24 through a fryer outlet line 24o to cooking-oil filtration system 10 through an inlet/bypass valve 34 which directs flow of clean cooking oil to filter chamber 10c through filter inlet line 10i. With upper platen 42 in a closed position as indicated by a filter-chamber position sensor 48 (in embodiment 10, platen position switches, also 48), pressure provided by filter pump 32 drives cooking oil through media 44m in filter chamber 10c and through filter outlet line 10o into clean tank 26. Clean cooking oil is then pumped by clean pump 28 into fryer 24 through a clean supply valve 30 and a fryer inlet line 24i.

When desired, bypass valve 34 may be used to redirect cooking oil into clean tank 26 without flowing through filter media 44m. Bypass valve 34 may be used to redirect cooking oil from fryer outlet line 24o directly into clean tank 26 through a first bypass line 10b. A bleedoff valve 38 may be used to vent cake-drying air and cooking oil directly into clean tank 26 through bleedoff line hose 36h and bleedoff lines 36 and 36b before opening filter chamber 10c.

Cooking-oil filtration system 10 also includes components used to dry the cake and discharge spent media 44m, including a cake dry valve 56, a cake cooling valve 62, and a cake discharge hopper 60. When a section of media 44m is spent (i.e., a filter cake on media 44m is ready to be discharged), cake dry valve 56 is opened to provide pressurized air from plant air supply 58 into upper platen 42 to dry the filter cake, driving free liquid above the filter cake through the filter cake. When the cake dry process is complete, actuator 46 is used to raise upper platen 42 to open filter chamber 10c, and the filter cake is discharged into cake discharge hopper 60 where it is cooled by opening cake cooling valve 62 which sprays water from plant water supply 64 to cool the discharged filter cake. (Note that in the schematic of FIG. 7, the position of hopper 60 is not shown next to where the filter cake would be discharged from spent media 44m advancing to the left from filter chamber 10c.) At this point in the media discharge process, spent media 44m has been rolled onto spent-media roller 50, and clean section of media 44m is in place within filter chamber 10c from clean-media roller 44.

Cooking-oil filtration system 10 may be used in a facility which includes an optional external (user-supplied) bypass valve 66 which redirects cooking oil from fryer 24 through an external bypass line 66b back to fryer 24 without cooking oil passing through filter chamber 10c. (Valve 66 and bypass line 66b are represented by dotted lines in FIG. 7.) Bypass valve 66 is facility-controlled separately from controller 20; however, valve 66 provides a feedback signal to controller 20 with an indication of its position. Valve 66 is thus also represented by dotted lines in FIG. 8B.

Figures 8A, 8B:
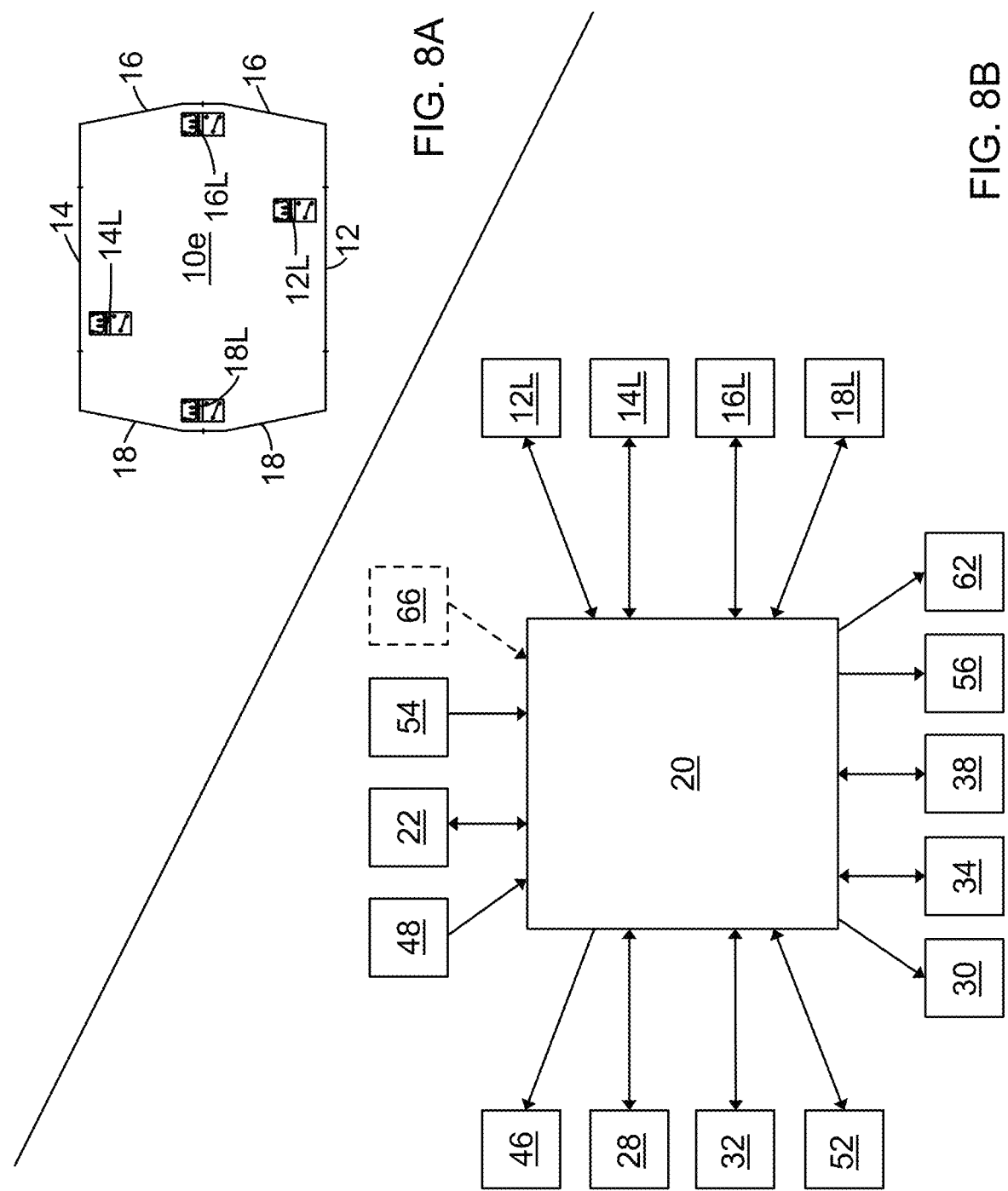
FIG. 8A is schematic representation of the electromagnetic door locks present in the embodiment of FIG. 1.
FIG. 8B is a functional block diagram of the electrical/electronic systems in the embodiment of FIG. 1.

Referring now to FIGS. 8A and 8B, FIG. 8A illustrates schematically the association between door locks 12L, 14L, 16L, and 18L with the corresponding doors 12, 14, 16, and 18 in enclosure 10e. FIG. 8B is a functional block diagram of the electrical/electronic systems in cooking-oil filtration system 10. Programmable controller 20 is shown with indications of system connectivity shown with arrows having either one arrowhead (flow of signals in only one direction) or two arrowheads (bi-directional flow of signals); such lines do not represent a particular type of wire connection but rather the flow of information or signals. For example, door locks 12L, 14L, 16L, and 18L may be MGL Non-Contact RFID Coded Locking Safety Switches manufactured by IDEM Safety Switches Limited, headquartered in Wigan, United Kingdom. Such switches include an electromagnetic locking actuator and a switch to indicate the state of the locking mechanism, these two separate functions representing the bi-directionality of the connections to the door locks. Signals which control the locking and unlocking of doors 12, 14, 16, and 18 flow to the actuators of door locks 12L, 14L, 16L, and 18L while indications of the lock state of such locks flow back from the switches therein to controller 20. Again note that the connectivity is based on information flow within the system. For example, door locks 12L, 14L, 16L, and 18L are shown in a parallel structure, but such door locks may be physically connected in parallel if desired without affecting the information or signal connectivity representations as shown in FIG. 8.

In addition to door locks 12L, 14L, 16L, and 18L and controller 20, the block diagram of FIG. 8B includes clean pump 28, filter pump 32, and reroller 52, all of which are connected to controller 20 with bi-directional connections. Clean pump 28, filter pump 32, and reroller 52 are each configured such that motor motion is sensed, providing feedback information on the state of these devices to controller 20. Platen position switches 48 (filter-chamber position sensor, also 48) provide position feedback information for platen 42; thus the arrows between controller 20 and actuator 46 and switches 48 are shown in one direction. Also connected to controller 20 are clean supply valve 30, cake dry valve 56, cake cooling valve 62, input/bypass valve 34, and bleedoff valve 38, the latter two of these valves being connected bi-directionally to controller 20 to provide system 10 with an indication of valve state. A feedback signal from external bypass valve 66 is also connected to controller 20 as described above.

Finally, the functional block diagram of FIG. 8B includes platen position switches 48 and pressure sensor 54, both of which provide upper platen 42 position and chamber 10c pressure, respectively, to controller 20, and graphical user interface 22 which is bi-directionally connected to controller 20 since it includes touch-screen display 22d, both an output and input device.

During operation, enclosure 10e, controller 20, and the system components shown in FIGS. 7, 8A, and 8B are configured to provide operator safety by preventing access to the inside of enclosure 10e when cooking-oil filtration system 10 is in an unsafe operational state. Such an unsafe operational state is defined as one or more of the following conditions being true: (a) at least one electrically-controlled pump is moving; (b) the pressure in filter chamber 10c is above a preset threshold; (c) the position of upper platen 42 is such that filter chamber 10c is closed; and (c) media discharge reroller 52 is moving. Only when certain subsets or all of these conditions are false can the door locks 12L, 14L, 16L, and 18L be placed in unlocked states by controller 20. In embodiment 10, the at least one electrically-controlled pump includes filter pump 32 and clean pump 28. The preset threshold may be about 2 psi above atmospheric pressure.

Such operational performance is controlled by programmable controller 20, and in addition to programs loaded into controller 20, the programming of controller 20 includes entry of operating system setpoints and other control inputs using graphical user interface 22 and display 22d. Such interaction is described in detail in the sections below.

FIGS. 9-22 are a set of screenshots from display 22d illustrating a number of different screens which are generated by programmable controller 20 during operation of cooking-oil filter system 10. In the descriptions of FIGS. 9-22 which follow, the terms "screenshot of an embodiment of" are dropped but all such figures are to be regarded only as examples of possible embodiments of such screens generated by controller 20 during operation of system 10.

Figure 9:
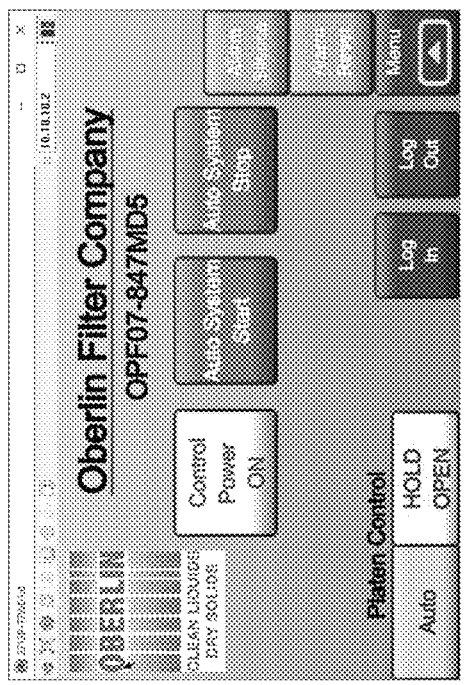
FIG. 9 is a screenshot of an embodiment of a main screen of the graphical user interface of the system of FIG. 1.
Figure 10:
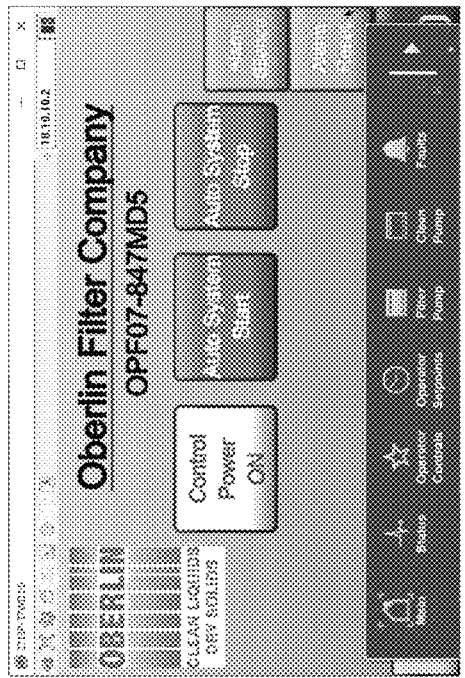
FIG. 10 is a screenshot of an embodiment of the main screen shown in FIG. 9 but including an embodiment of a controller menu.

FIG. 9 illustrates a main screen of display 22d of graphical user interface 22. Such main screen provides a user with high-level control of system 10 such as control power, system auto start/stop, user login/logout, platen control, alarm control, and a show-menu control. FIG. 10 shows such a menu being displayed on the main screen with various control options which will be described further below. In addition to the Menu arrow control which displays the menu when touched on display 22d (a touch screen in embodiment 10), the lower right corners of FIGS. 9 and 10 also include Alarm Silence and Alarm Reset controls. In the screen shots in FIGS. 11-20, the Alarm Silence and Alarm Reset controls are labeled with a checkmark icon and a curved left-pointing arrow, respectively.

Figure 11:
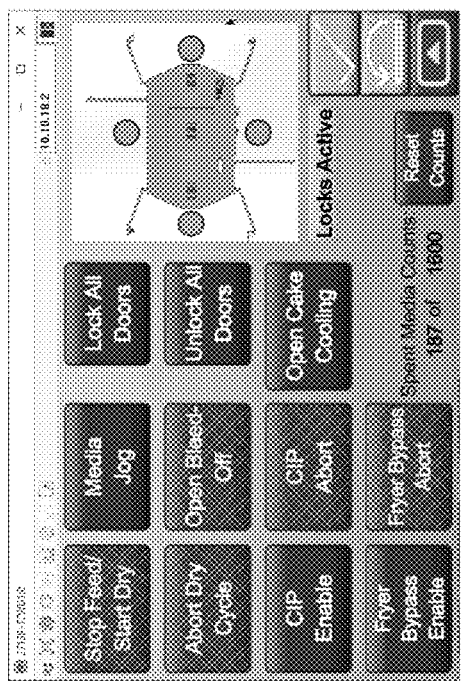
FIG. 11 is a screenshot of an embodiment of an operator controls screen of the graphical user interface of the oil filtration system of FIG. 1.

FIG. 11 depicts an operator controls screen with controls for the following: stop feed/start dry, abort dry cycle, clean-in-place control, fryer bypass control, media jog control, cake cooling control, and door-lock controls. A top-view schematic depicts door status. The operator controls screen is reached by touching the "Operator Controls" item in the menu.

Figure 12:
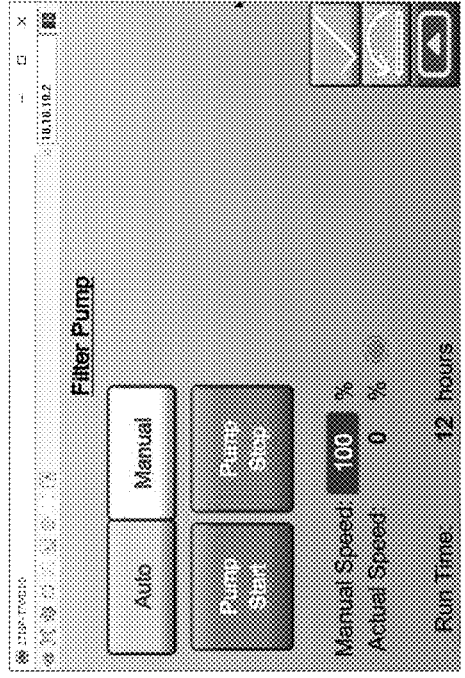
FIG. 12 is a screenshot of an embodiment of a filter-pump control screen of the graphical user interface of the oil filtration system of FIG. 1.
Figures 13, 14, 15, 16:
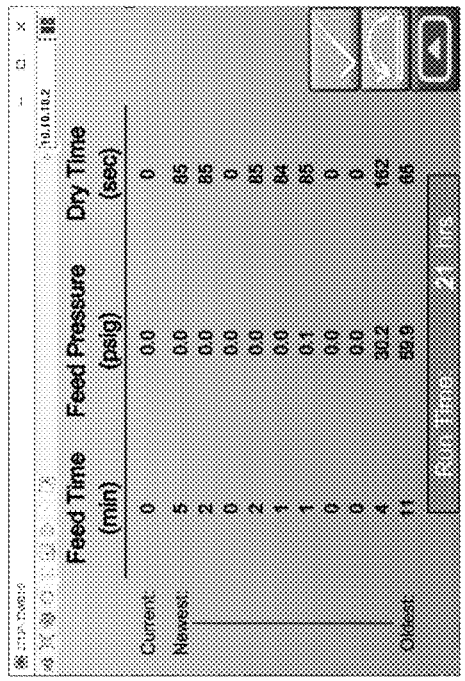
FIG. 13 is a screenshot of an embodiment of a clean-pump control screen of the graphical user interface of the oil filtration system of FIG. 1.
FIG. 14 is a screenshot of an embodiment of a filter-cycle history screen of the graphical user interface of the oil filtration system of FIG. 1.
FIG. 15 is a screenshot of an embodiment of a filter status screen of the graphical user interface of the oil filtration system of FIG. 1.
FIG. 16 is a screenshot of an embodiment of an active-alarm status screen of the graphical user interface of the oil filtration system of FIG. 1.

FIGS. 12 and 13 show screens which provide pump control and information on pump status for filter pump 32 and clean pump 28, respectively. FIG. 12 and several other later screens in this series of screenshots display an indication of filter and pump run time. FIG. 13 also includes some operational and setpoint data as shown. FIG. 14 illustrates a display of filter-cycle history data, and FIG. 15 shows a filter status screen, displaying a number of component status indicators as illustrated.

FIG. 16 is a screenshot of an embodiment of an active-alarm status screen, in this illustration displaying an exemplary "out of media" event at the time at which such event occurred.

Figure 18:
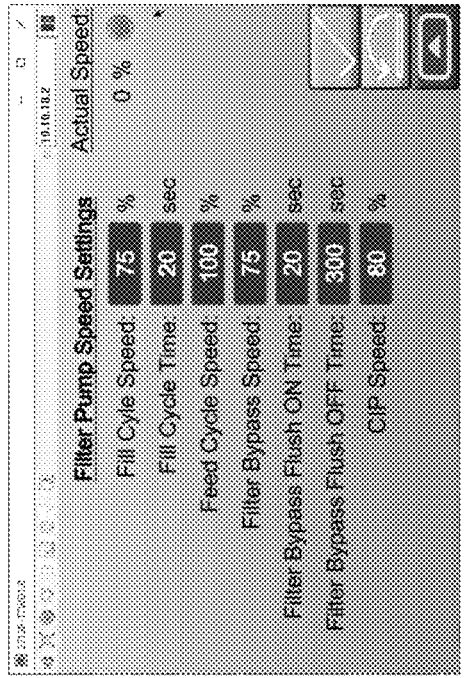
FIG. 18 is a screenshot of an embodiment of a second filter-setup screen of the graphical user interface of the oil filtration system of FIG. 1.
Figure 20:
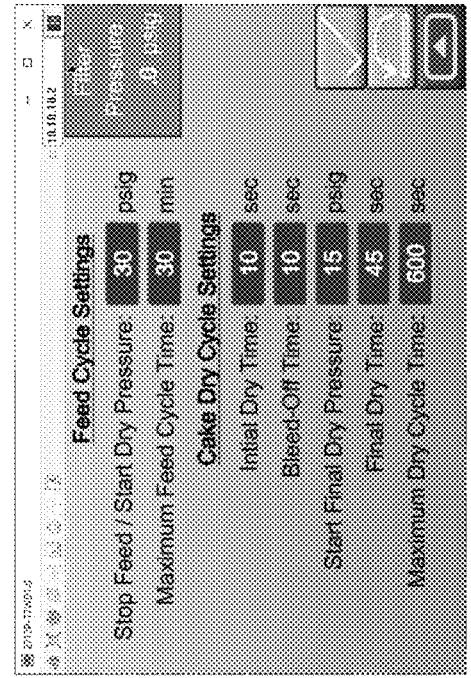
FIG. 20 is a screenshot of an embodiment of a fourth filter-setup screen of the graphical user interface of the oil filtration system of FIG. 1.
Figure 17:
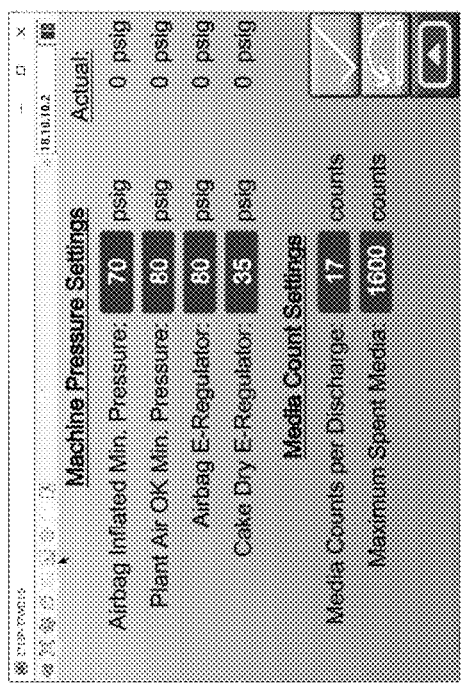
FIG. 17 is a screenshot of an embodiment of a first filter-setup screen of the graphical user interface of the oil filtration system of FIG. 1.
Figure 19:
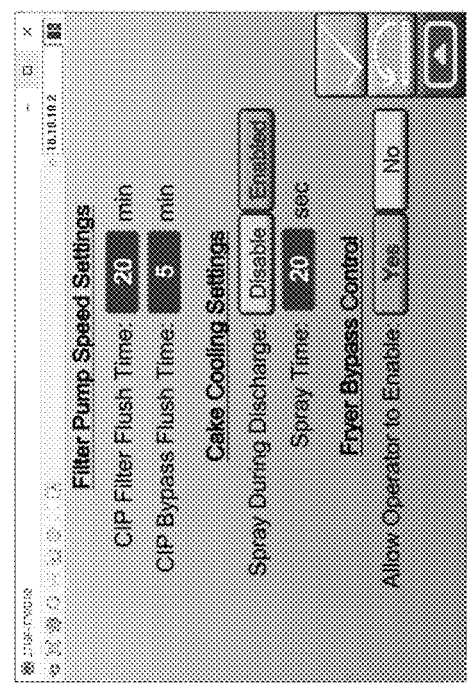
FIG. 19 is a screenshot of an embodiment of a third filter-setup screen of the graphical user interface of the oil filtration system of FIG. 1.

FIGS. 17-20 are screenshots of first, second, third, and fourth filter-setup screens, respectively. A number of operational parameters are available to be set by the user as illustrated, such as machine pressure and media count settings (FIG. 17), filter pump speed settings (FIGS. 18-19), filter cake cooling and fryer bypass settings (FIG. 19), and feed cycle and filter cake dry cycle settings (FIG. 20). FIGS. 17-18 and 20 also display some operational current values. In embodiment 10, media count corresponds to the length of clean media 44m moved into filter-chamber 10c as a filter cake is discharged into cake discharge hopper 60.

Figure 21:
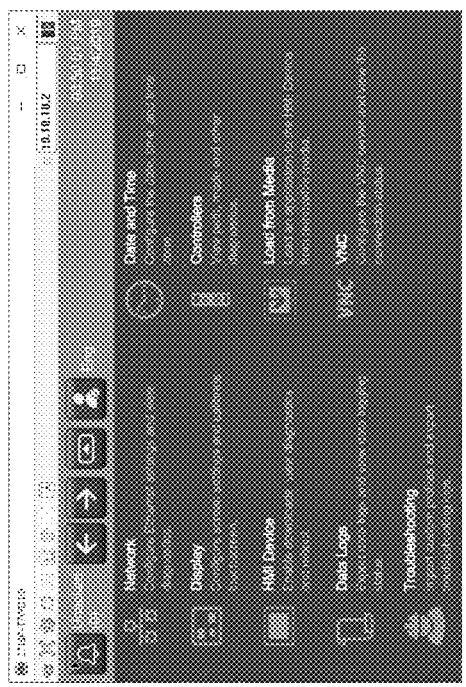
FIG. 21 is a screenshot of an embodiment of a systems settings setup screen of the graphical user interface of the oil filtration system of FIG. 1.

FIG. 21 is a screenshot of an embodiment of a systems settings setup screen which makes available high-level system settings to the user. Such settings are common to numerous computer-controlled systems and are well-known to those skilled in this technical field.

Figure 22:
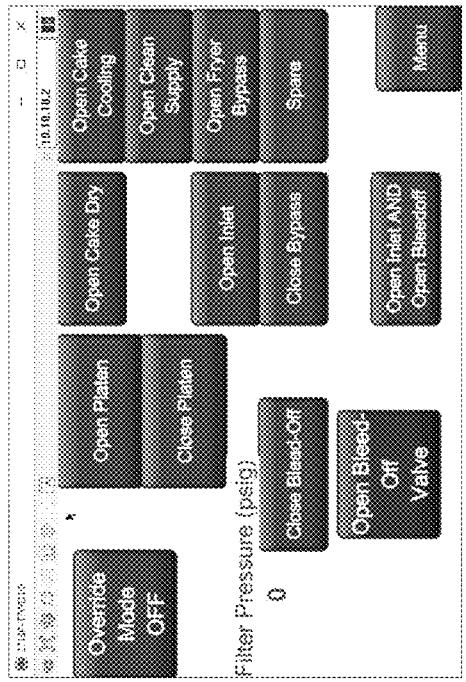
FIG. 22 is a screenshot of an embodiment of an override test screen of the graphical user interface of the oil filtration system of FIG. 1.

FIG. 22 is a screenshot of an embodiment of an override test screen which provides a user with controls for overriding the automated operation of certain filter components helpful for maintenance and troubleshooting functions. As with the screenshot of FIG. 21, such controls are common to numerous computer-controlled systems and are well-known to those skilled in this technical field.

The present invention provides an extremely important safety feature which prevents a user from being exposed to cooking oil at the high pressures utilized in such filtration systems. During operation of cooking-oil filtration system 10, programmable controller 20 is configured such that the unlocking of doors 12, 14, 16, and 18 is permitted only if (a) filter pump 32 and clean pump 28 are off (no pump motion), (b) the pressure in filter chamber 10c is below the preset threshold (2 psi above atmospheric pressure in embodiment 10), filter chamber 10c is open, and reroller 52 is stopped. In certain other configurations of the system, such as if the system includes external bypass valve 66, controller 20 may be configured to permit unlocking of doors 12, 14, 16, and 18 only if (1) clean pump 28 is off, (2) the pressure in filter chamber 10c is below the preset threshold, and (3) reroller 52 is stopped.

Depending on certain choices made by the user, cooking-oil filtration system 10 may require a subset of the above-listed conditions to be satisfied in order for controller 20 to permit unlocking of doors 12, 14, 16, and 18.

In preferred embodiments of the inventive cooking-oil filtration system, unlocking the doors further requires that both the filter and clean pumps are off. In some of these embodiments, unlocking the doors further requires that the filter chamber is open.

In some highly-preferred embodiments, unlocking the doors further requires that the discharge reroller is stopped.

In some highly-preferred embodiments of the inventive cooking-oil filtration system, the predetermined pressure is 2 psi above atmospheric pressure. In some embodiments, the cooking-oil filtration system further includes an external bypass valve configured to provide an external bypass from the cooking apparatus to a clean tank upstream of the cooking apparatus and an external-bypass-valve status signal to the controller. In some of these embodiments, the at least one pump is the clean pump and unlocking the doors further requires that the external bypass valve be in a bypass mode.

While the principles of the invention have been shown and described in connection with specific embodiments, it is to be understood that such embodiments are by way of example and are not limiting.

The invention claimed is:

1. A cooking-oil filtration system for automated cooking apparatus which has a solids-removing filter for cleaning cooking oil from a food-fryer and returning oil to the cooking apparatus, the system comprising:
    a solids-removing filter enclosure which includes a plurality of doors having electronically-controlled locks with lock-state feedback;
    a programmable controller including memory and software for controlling the filtration system and a graphical user interface;
    a filter pump and a clean pump, each electrically-controlled;
    a filter chamber and an electrically-controlled filter-chamber actuator;
    a filter-chamber position sensor;
    an electrically-controlled media discharge reroller;
    a filter-chamber pressure sensor; and
    at least one display presenting the graphical user interface comprising a plurality of screens with icons for interaction by a user, each of the icons representing system set-up, status, and actions, the screens comprising:
        a main screen with an array of high-level system controls;
        an operator controls screen displaying an array of icons representing a plurality of filter-operating controls including door-lock controls displaying door-lock status and controls to lock and unlock the doors, such unlocking permitted only when at least one pump is off and the filter-chamber pressure is below a predetermined pressure;
        one or more status screens displaying status of filter operation; and
        one or more setup screens for setting filter operating parameters.

2. The cooking-oil filtration system of claim 1 wherein unlocking the doors further requires that both the filter and clean pumps are off.

3. The cooking-oil filtration system of claim 2 wherein unlocking the doors further requires that the filter chamber is open.

4. The cooking-oil filtration system of claim 3 wherein unlocking the doors further requires that the discharge reroller is stopped.

5. The cooking-oil filtration system of claim 1 wherein the predetermined pressure is 2 psi above atmospheric pressure.

6. The cooking-oil filtration system of claim 1 further including an external bypass valve configured to (a) return cooking oil to the cooking apparatus without passing through the filter chamber and (b) provide an external-bypass-valve status signal to the controller.

7. The cooking-oil filtration system of claim 6 wherein the at least one pump is the clean pump and unlocking the doors further requires that the external bypass valve be in a bypass mode.

* * * * *